United States Patent
Roytman et al.

(10) Patent No.: US 8,209,701 B1
(45) Date of Patent: *Jun. 26, 2012

(54) TASK MANAGEMENT USING MULTIPLE PROCESSING THREADS

(75) Inventors: Evgeny Roytman, Sharon, MA (US); Michael G. Hegerich, Holliston, MA (US); Michael J. Virgil, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/863,018

(22) Filed: Sep. 27, 2007

(51) Int. Cl.
*G06F 9/46* (2006.01)

(52) U.S. Cl. ...................................... 718/106

(58) Field of Classification Search .................. 718/106
See application file for complete search history.

(56) References Cited

U.S. PATENT DOCUMENTS

| | | | | |
|---|---|---|---|---|
| 5,471,622 A * | 11/1995 | Eadline | ................................ | 1/1 |
| 5,838,976 A * | 11/1998 | Summers | ...................... | 717/130 |
| 6,542,920 B1 * | 4/2003 | Belkin et al. | ................. | 718/104 |
| 6,938,257 B1 * | 8/2005 | Rapp et al. | ..................... | 719/311 |
| 7,047,252 B2 * | 5/2006 | Buch et al. | ..................... | 707/718 |
| 7,451,445 B1 * | 11/2008 | Eppstein | ....................... | 718/100 |
| 2007/0203910 A1 * | 8/2007 | Ferguson et al. | ................. | 707/8 |

* cited by examiner

*Primary Examiner* — Meng An
*Assistant Examiner* — Wissam Rashid
(74) *Attorney, Agent, or Firm* — Krishnendu Gupta; Gerald P. Kazanjian

(57) ABSTRACT

A task manager (or related operation) keeps track of free processing threads amongst multiple processing threads. The task manager receives a request to execute a task. Prior to execution, the task manager processes the task to identify portions of the task that must be executed in parallel. In response to detecting that there is a first processing thread in the pool free to execute a main portion of the task as well as sufficient free additional processing threads in the pool to execute each of the identified sub-tasks in parallel, the task manager submits the task for execution by the pool of multiple processing threads. For accounting purposes, the task manager modifies tracking information to indicate that the first processing thread and additional processing threads are now unavailable for use for execution of other tasks.

17 Claims, 13 Drawing Sheets

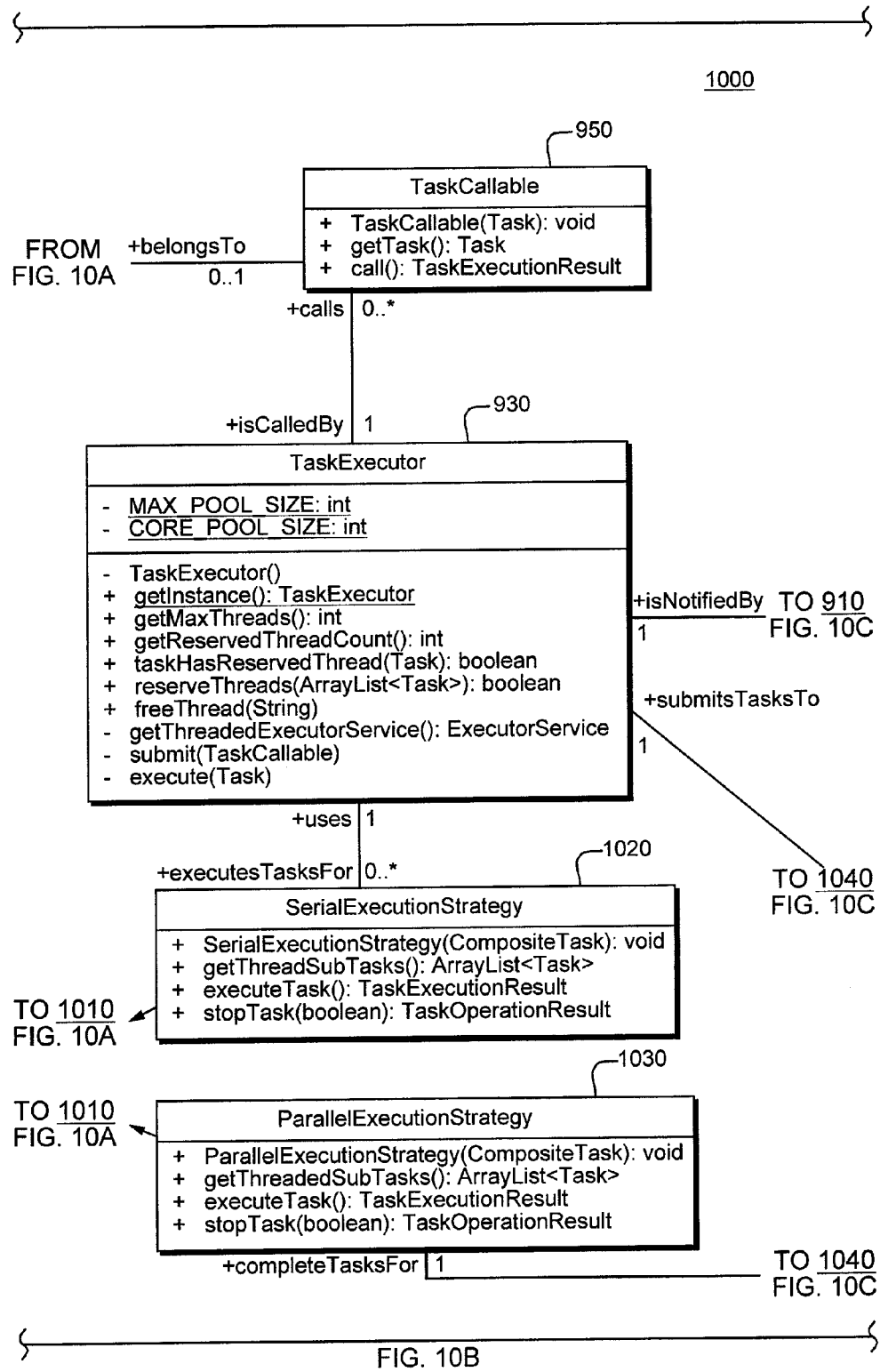

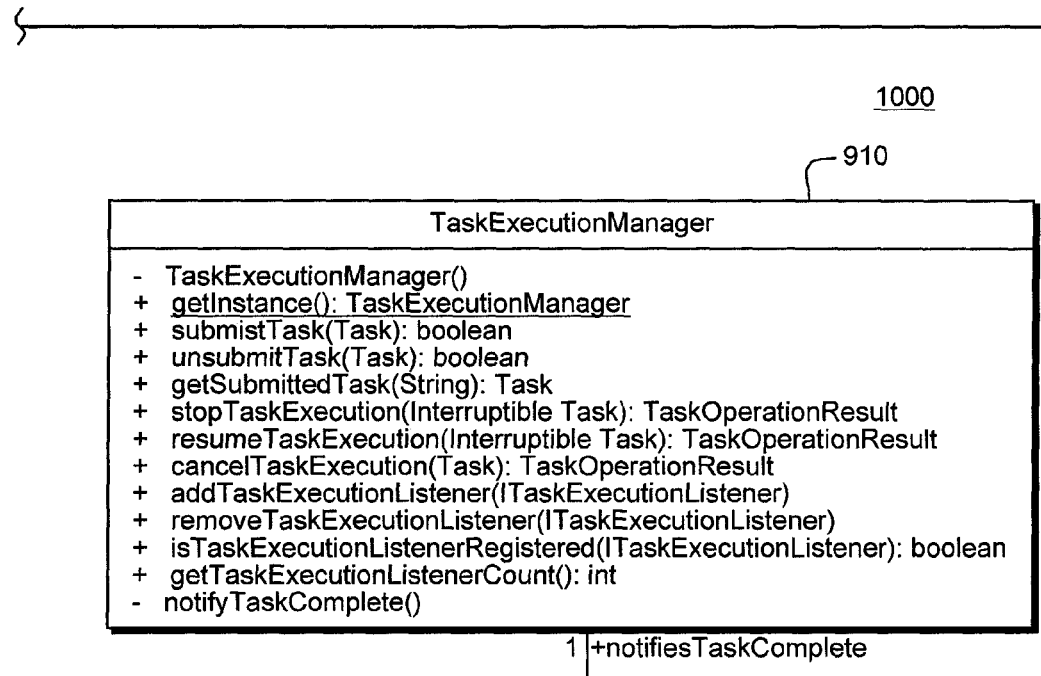

TaskExecutionManager (910)

- − TaskExecutionManager()
- + <u>getInstance(): TaskExecutionManager</u>
- + submistTask(Task): boolean
- + unsubmitTask(Task): boolean
- + getSubmittedTask(String): Task
- + stopTaskExecution(Interruptible Task): TaskOperationResult
- + resumeTaskExecution(Interruptible Task): TaskOperationResult
- + cancelTaskExecution(Task): TaskOperationResult
- + addTaskExecutionListener(ITaskExecutionListener)
- + removeTaskExecutionListener(ITaskExecutionListener)
- + isTaskExecutionListenerRegistered(ITaskExecutionListener): boolean
- + getTaskExecutionListenerCount(): int
- − notifyTaskComplete()

1 +notifiesTaskComplete

FROM 930
FIG. 10B

FROM 930
FIG. 10B

+executesTasksFor  0..*

ParallelTaskCompletionService (1040)

- + completeTasks(ArrayList<Task>,CompositeTaskExecutionResult*)
- + stopTaskExecution(boolean): ArrayList<TaskOperationResult>

+uses  1

FROM 1030
FIG. 10B

FIG. 10C

TASK MANAGEMENT USING MULTIPLE PROCESSING THREADS

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

SUMMARY

Conventional storage area network management applications such as those as discussed above may suffer from a number of deficiencies. For example, the tasks associated with a storage area network can be carried out using multiple conventional processing threads that execute in parallel. However, special care must be taken to avoid a deadlock condition in which none of multiple processing threads are able to proceed to completion because two or more processes are each endlessly waiting for each other to release a resource needed to complete execution of a pending task.

Techniques discussed herein deviate with respect to conventional applications such as those discussed above as well as techniques known in the prior art. For example, embodiments herein provide a novel and useful way for executing multiple tasks and avoiding deadlock.

More specifically, in one embodiment, a task manager receives a request to execute a task. The task manager receives the task to be executed. Prior to execution, the task manager processes the task to identify a main portion of the task as well as sub-tasks associated with the task. The task manager conditionally submits the task for execution by a pool of multiple processing threads. For example, the task manager (or related operation) keeps track of value representing a number of processing threads in the pool of multiple processing threads that are free (e.g., processing threads that have not been reserved or have been freed).

In response to detecting that there is a one processing thread free to execute the main portion of the task as well as enough free additional processing threads in the poll to execute each of the identified sub-tasks of the task in parallel (if so desired), the task manager submits the task for execution by the pool of multiple processing threads. For accounting purposes, the task manager modifies status information associated with the pool to indicate that a number of corresponding processing threads (e.g., the processing thread executing the main task and the additional processing threads) are now unavailable for executing other sub-tasks. The task manager prevents submission of other tasks for execution by the pool unless there are enough unallocated or unreserved processing threads free to execute the one or more subsequent task.

In a more specific example embodiment, the task manager initially maintains a reference value representing a number of free processing threads present in the pool. Each time the task manager initiates execution of a task by the pool, the task manager reduces the reference value by an amount equal to a number of processing threads needed (or potentially needed) to carry out parallel execution of the task. For example, if the pool includes 20 processing threads and a first task submitted for execution requires 8 processing threads, the task manager reduces the reference value to 12 (e.g., by subtracting 8 from 20). Thus, upon submitting the task for execution by the pool, the task manager simultaneously reserves a block of processing threads (e.g., 8 processing threads) including one processing thread to execute a main portion of the task and additional processing threads (e.g., 7 other processing threads) to execute sub-tasks associated with the task.

As allocated or reserved processing threads complete corresponding sub-tasks, the task manager increments the reference value for each newly freed processing thread. When there are enough freed up processing threads, the task manager can submit a subsequent task for execution by the pool. For example, assume that a subsequent task requires 15 processing threads when the reference value is equal to 12 as a result of allocating 8 processing threads for use by the first task. The task manager will not submit the subsequent task for execution under such conditions because there are not currently 15 unreserved processing threads available in the pool.

As the sub-tasks associated with the first task are completed, the task manager receives a corresponding notification of such a condition and increments the reference value by one for each newly freed processing thread. In other words, the task manager can receive indications at different times when processing threads have completed execution of the identified sub-tasks. As respective processing threads are freed up over time as a result of completing execution of a sub-task, the task manager maintains the respective processing threads as being free for use by a subsequent task even though the first processing thread has not completed execution of the main portion of the task.

Thus, after 3 processing threads become free over time, the task manager increments the reference value to 15 indicating that there are now 15 free unallocated processing threads available for use by other tasks. Under these conditions, the task manager submits the subsequent task for execution by the pool of multiple processing threads and reduces the reference value from 15 to 0. The task manager thus keeps track of newly freed processing threads and, when enough processing threads are available, submits yet other such tasks for processing.

Based on such techniques, the task manager can avoid deadlock by preventing over allocation of the processing threads to different tasks. For example, the task manager waits for an appropriate number of free processing threads and assumes that any reserved or allocated processing threads are still needed or are currently being used by a task or corresponding sub-task until the task manager and/or corresponding monitor function receives a notification that the task or corresponding sub-task has been completed.

In one embodiment, the task manager maintains the pool of multiple processing threads to include a fixed number of processing threads although the number of processing threads in the pool can vary over time.

These and other embodiments such as task management, pre-processing of tasks to identify required resources, maintaining status information reflecting a number of free and unallocated processing threads, etc. will be discussed later in this specification.

Note that embodiments disclosed herein include any type of computerized device, workstation, handheld or laptop computer, or the like configured with software and/or circuitry (e.g., a processor) to process any or all of the method operations disclosed herein. In other words, embodiments herein can include a computerized device such as a computer or storage area network manager or any type of processor that is programmed or configured to provide task management functions as explained herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform any of the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

In addition to the embodiments discussed above, other embodiments herein include a computerized device (e.g., a host computer, workstation, etc.) configured to support the techniques disclosed herein such as management of tasks and their execution. In such embodiments, a computer environment to carry out the invention includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports task management and execution according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support task management and related functions according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

As an example, a more particular technique of the present disclosure is directed to a computer program product or computer environment that includes a computer readable medium having instructions stored thereon to facilitate execution of tasks and/or use of multiple processing threads. The instructions and their corresponding execution support operations of: i) receiving a task; ii) processing the task to identify portions of the task to be executed by separate processing threads; iii) monitoring a pool of multiple processing threads; and iv) in response to detecting that there are enough free processing threads for simultaneous execution of each of the identified portions of the task in parallel, submitting the task for execution by the pool of multiple processing threads.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

Techniques herein are well suited for use in applications such as those supporting task management in a storage area network environment. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 10A, 10B, and 10C are example diagrams illustrating composite task execution according to embodiments herein.

DETAILED DESCRIPTION

According to one embodiment, a task manager (or related operation) keeps track of free processing threads amongst multiple processing threads. Upon receiving a task for execution, the task manager processes the task to identify portions (e.g., a main portion as well as sub-tasks) of the task that may be executed in parallel. In response to detecting that there is a processing thread in the pool that is free to execute a main portion of the task as well as sufficient free additional processing threads in the pool to execute each of the identified sub-tasks in parallel (if they are needed), upon submitting the task for execution, the task manager submits the task for execution by the pool of multiple processing threads. For accounting purposes, the task manager modifies tracking information to indicate that the first processing thread and additional processing threads are now unavailable for use by other processing threads.

In one embodiment, the task manager submits the main portion of the task to the pool for execution. When executed, the main portion of the task spawns (e.g., initiates execution of) other sub-tasks associated with the task via other processing threads in the pool.

Figure 1:
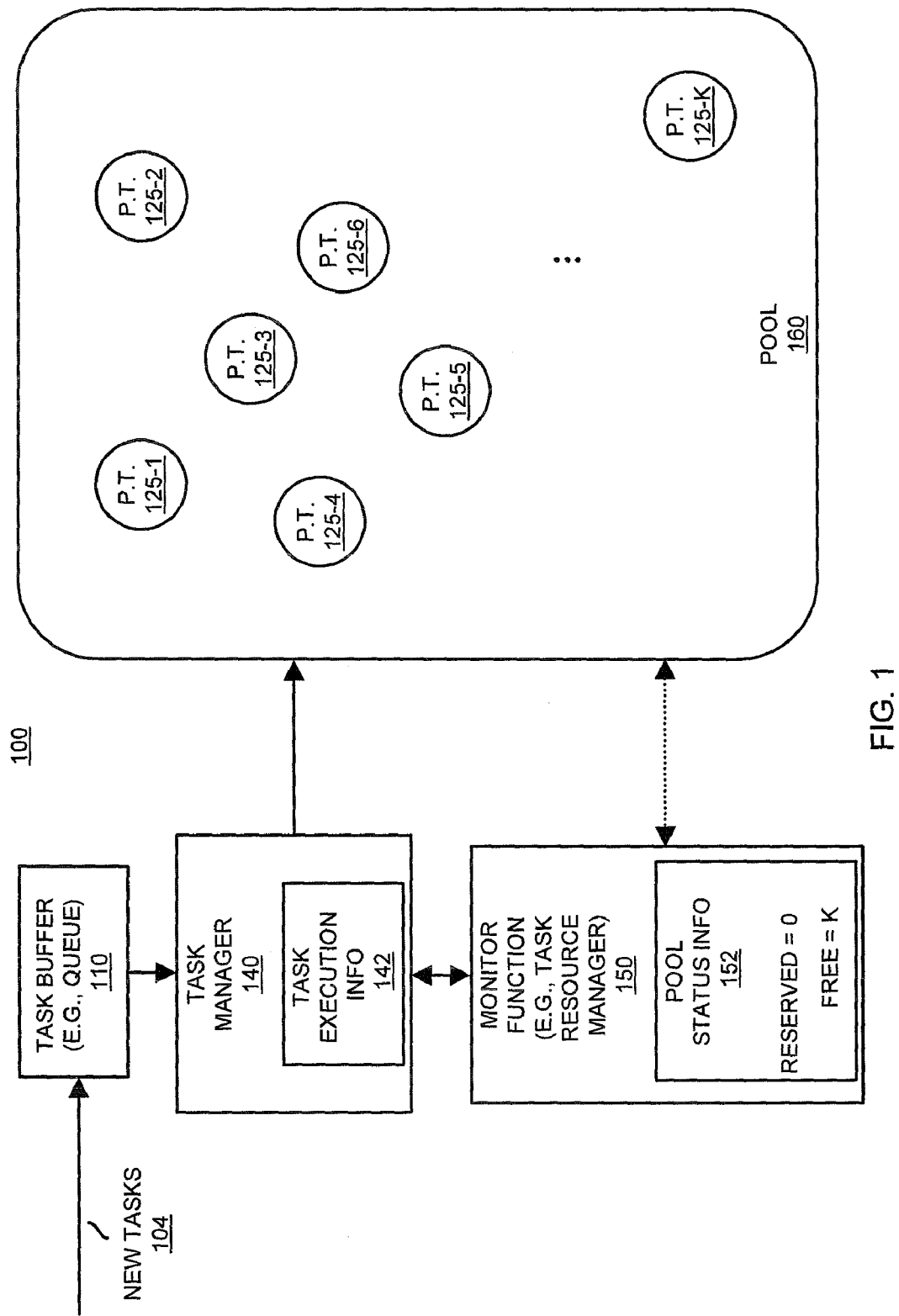
FIG. 1 is an example diagram illustrating an environment for executing tasks and related sub-tasks according to embodiments herein.

Now, more specifically, FIG. 1 is an example diagram illustrating a task management and execution environment according to embodiments herein. As shown, environment 100 includes a task buffer 110 to store newly received tasks 104, a task manager 140 that submits received tasks to pool 160 for execution by processing threads 125 (e.g., processing thread 125-1, processing thread 125-2, processing thread 125-3, processing thread 125-4, processing thread 125-5, processing thread 125-6, . . . , processing thread 125-K), and a monitor function 150 (e.g., a task resource manager) configured to monitor or keep track of reserved processing threads 125 in pool 160.

In one embodiment, task manager 140 analyzes received tasks 104 (e.g., tasks in task buffer 110) to identify what and/or how many resources in pool 160 are needed to execute such tasks 104. The task manager 140 stores this information as task information 142.

Figure 2:
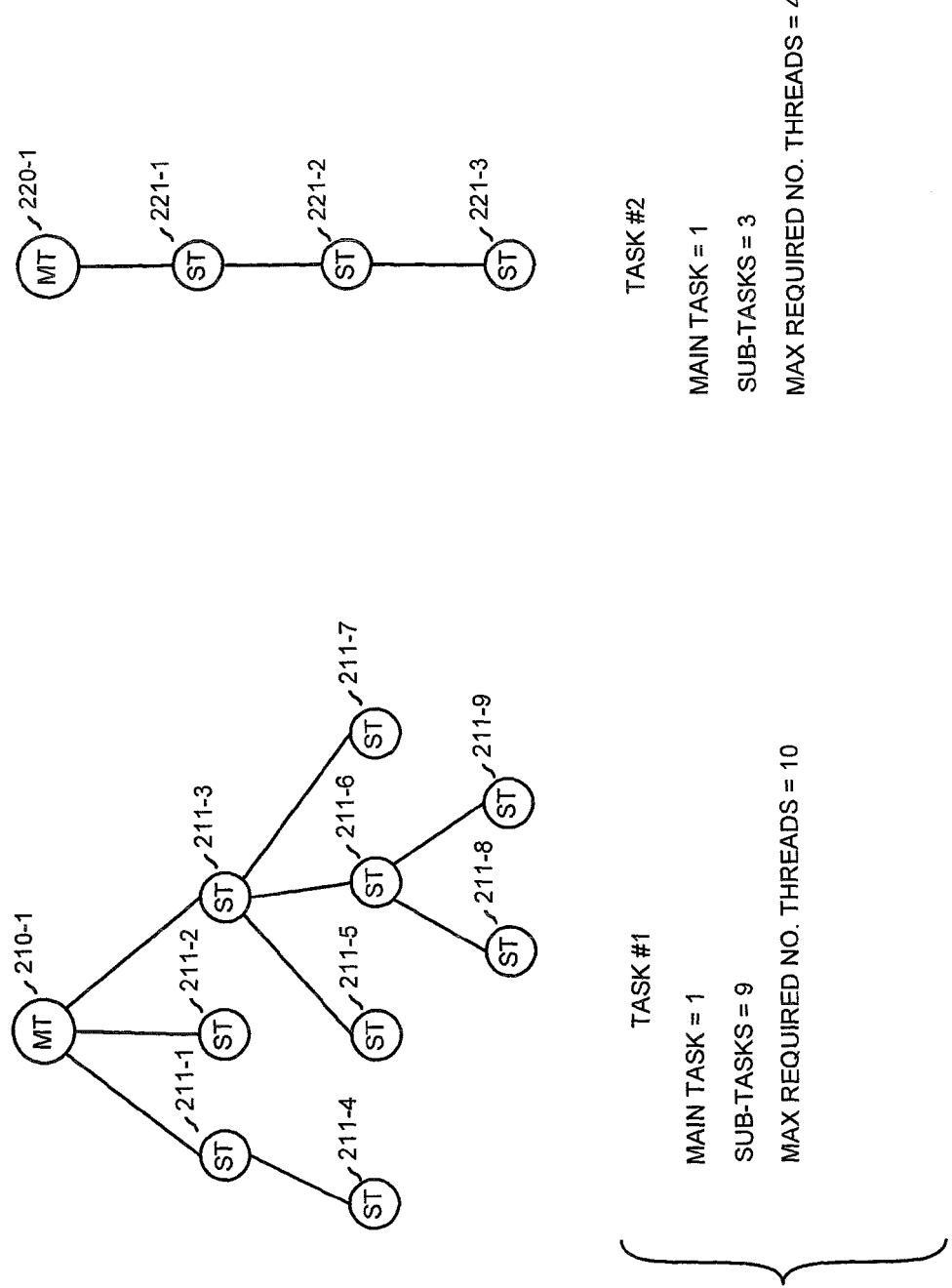
FIGS. 2 and 3 are example diagrams illustrating different tasks and related sub-tasks according to embodiments herein.
Figure 3:
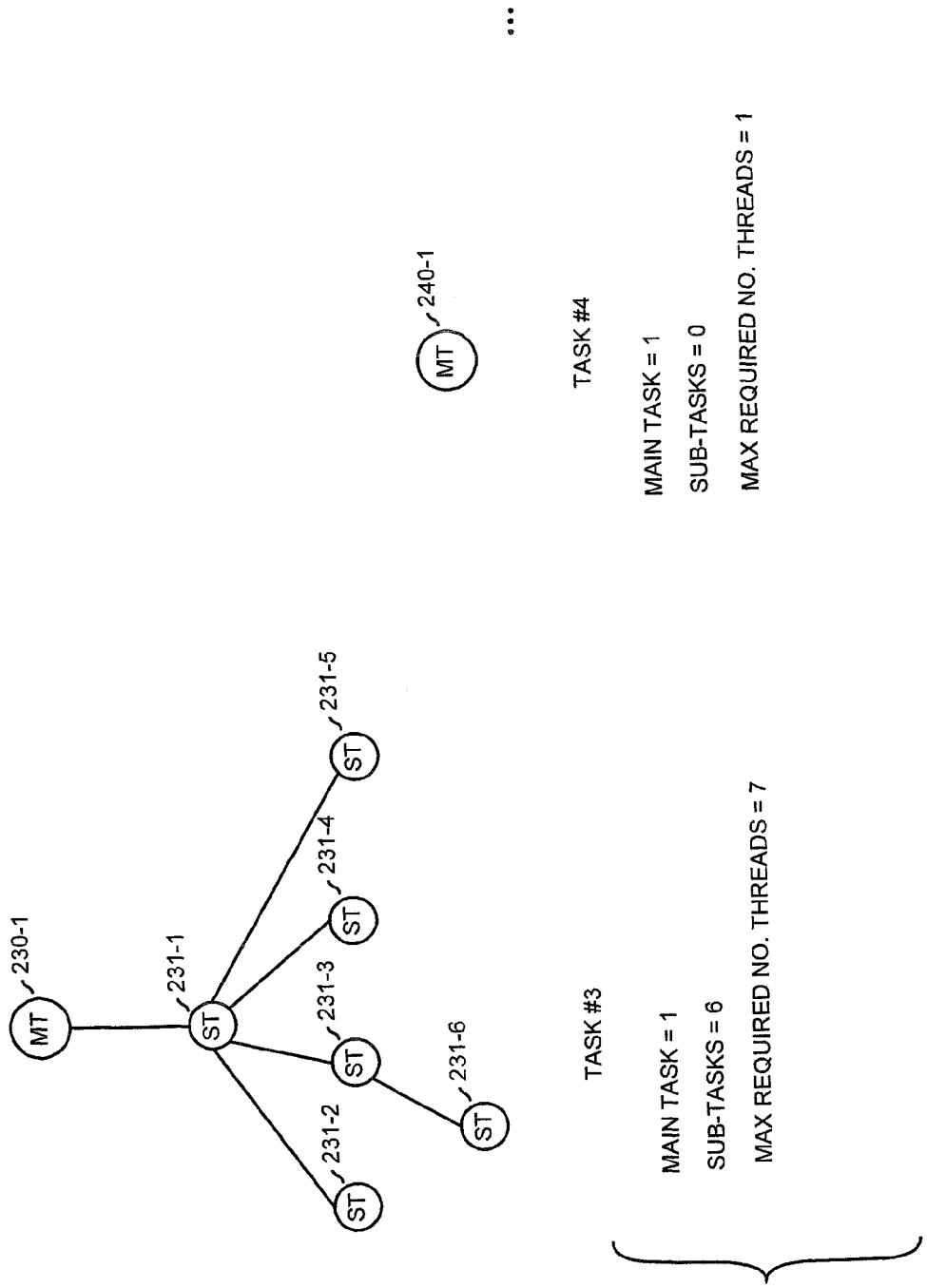

FIGS. 2 and 3 are example diagrams illustrating different types of sample tasks (e.g., segments or portions of software code) according to embodiments herein. Assume in this example that each main task and corresponding sub-task requires its own separate processing thread in pool for execution. As discussed in another embodiment under the heading "Variations and Additional Embodiments", the task manager 140 can be configured to identify which parent tasks and corresponding sub-tasks can be executed by the same processing thread (e.g., serial) and which will be executed by different processing threads (e.g., parallel sub-tasks). The number of reserved processing threads (e.g., a worst case number of processing threads needed to carry out execution of task portions—whether executed serially or in parallel) thus can vary depending on the embodiment. However, for the following discussion of FIGS. 1-3, for simplicity, assume that each main task and each of the sub-tasks can require a corresponding processing thread for execution of same.

For example, task #1 in FIG. 2 is a composite task, portions of which are to be executed by different processing threads. As shown, task #1 includes main task 210-1 and corresponding sub-tasks 211 including sub-task 211-1, sub-task 211-2, sub-task 211-3, sub-task 211-4, sub-task 211-5, sub-task 211-6, sub-task 211-7, sub-task 211-8, and sub-task 211-9. Main task 210-1 resides at the root of the task tree. When analyzed by task manager 140, the task manager 140 identifies that task #1 is a composite task (because it has multiple sub-tasks), which means that task #1 includes a main task 210-1 (e.g., a parent or root) that will spawn multiple corresponding sub-tasks 211 when executed by a processing thread in pool 160.

Note that the sub-tasks 211 associated with task #1 also can be composite tasks that, when executed, spawn execution of other tasks. For example, sub-task 211-1 is a parent task with respect to sub-task 211-4; sub-task 211-3 is a parent task with respect to sub-task 211-5, sub-task 211-6, and sub-task 211-7, and so on.

As briefly mentioned above, each of the tasks (e.g., task #1, task #2, . . . ) can include multiple groupings (e.g., main task, sub-tasks, etc.) of software code. Certain groupings of the software code (e.g., sub-tasks) associated with a respective task may need to be executed in parallel while other portions of the software code (e.g., sub-tasks) may be executed serially depending on availability of resources to execute the task. Task manager 140 can be configured to analyze a given task (e.g., a set of software code) and determine which portions can be executed in parallel and which can be executed serially.

According to one embodiment, the task manager 140 analyzes the tasks to identify a maximum number of processing threads that would be needed to execute a corresponding task. For example, as previously discussed, the task manager 140 analyzes task #1. Based on the analysis, the task manager 140 identifies that identifies that task #1 includes is a composite task including one main task and 9 sub-tasks. According to a worst-case scenario, the task could require use of up to 10 processing threads—one processing thread for each of the main task and 9 corresponding sub-tasks.

Task #2 in FIG. 2 is another example of a composite task including portions of software code that can possibly be executed in parallel. As shown, task #2 includes main task 220-1 and corresponding sub-tasks 221 including sub-task 221-1, sub-task 221-2, sub-task 221-3, and sub-task 221-4. Main task 220-1 resides at the root of the task tree. When analyzed by task manager 140, the task manager 140 identifies that task #2 is a composite task, including main task 220-1 (e.g., a parent or root) that will spawn multiple corresponding sub-tasks 221 when executed by a processing thread in pool 160.

The task manager 140 analyzes task #2 to identify a maximum number of processing threads that possibly could be needed to execute task #2. Based on an analysis, the task manager 140 identifies that task #2 is a composite task including one main task and corresponding 3 sub-tasks. According to a worst-case scenario, the task #2 could require use of up to 4 processing threads—one processing thread for each of the main task and each of the three corresponding sub-tasks.

Task #3 in FIG. 3 is another example of a composite task including portions of software code that possibly can be executed in parallel. As shown, task #3 includes main task 230-1 and corresponding sub-tasks 231 including sub-task 231-1, sub-task 231-2, sub-task 231-3, sub-task 231-4, sub-task 231-5, and sub-task 231-6. As shown and as identified by task manager 140 based on processing, main task 230-1 resides at the root of the task tree. When analyzed by task manager 140, the task manager 140 identifies that task #3 is a composite task, including main task 230-1 (e.g., a parent or root) that will spawn multiple corresponding sub-tasks 231 when executed by a respective processing thread in pool 160.

In the context of the present example, the task manager 140 analyzes task #3 to identify a maximum number of processing threads that may possibly be needed to execute task #3. Based on this analysis, the task manager 140 identifies that task #3 is a composite task including one main task and 6 corresponding sub-tasks. According to a worst-case scenario, execution of task #3 by a pool of processing threads could possibly require use of up to 7 processing threads—one processing thread for the main task and one for each of the three corresponding sub-tasks.

Task #4 in FIG. 3 is an example of a non-composite task that does not include any corresponding sub-tasks to be executed in parallel. As shown, task #4 only includes main task 240-1 for execution by a corresponding processing thread in pool 160. In a similar manner as discussed above, the task manager 140 analyzes task #4 to identify that task #4 requires a maximum of a single processing thread to carry its execution.

Referring again to FIG. 1, the task manager 140 identifies and keeps track of a maximum possible number of processing threads in pool 160 needed to execute each task. Such information regarding which number of tasks are reserved (or not reserved) can be stored as pool status information 152.

Task manager 140 can select a task from task buffer 110 for execution based on priority rules. For example, tasks can be executed based on an order in which (requests to execute) the tasks are received, a relative priority level associated with a respective task, etc.

According to one embodiment, the task manager 140 submits the tasks for execution based on an ability of the pool 106 to execute the task. For example, recall that the monitor function 150 keeps track of a number of reserved processing threads (e.g., processing threads currently in use or processing threads reserved for a given task being executed) as well as a number of free (e.g., unreserved) processing threads associated with pool 160.

Assume in this example that (K=12) and pool 160 includes twelve processing threads for simultaneous execution of one or more tasks, sub-tasks, etc. However, as discussed above, note again that the pool 160 can include any number of processing threads depending on the size of the system and corresponding processing capability.

Based on the number of free (e.g., un reserved) processing threads in pool 160, the task manager 140 initiates execution of the tasks by processing threads in pool 160. For example, assume that buffer receives respective request to execute task #1, task #2, task #3, and task #4 as shown in FIGS. 2 and 3. Prior to submitting task #1 for execution by processing threads 125 in pool 160, the task manager 140 checks whether there are enough free resources (e.g., processing threads) in pool 160 to carry out execution of task #1.

To check an availability of processing threads 125, the task manager 140 queries monitor function 150 (e.g., task resource manager). In this example, the monitor function 150 can reserve enough processing threads to execute task #1 because there are twelve free processing threads in pool 160. Recall that task #1 requires up to 10 processing threads to execute main task 210-1 and corresponding sub-tasks 211 so there are certainly enough free processing threads to execute the task even if the main task 210-1 and all of the sub-tasks 211 happened to execute at the same time. Accordingly, based on feedback from the monitor function 150 that appropriate resources have been reserved for executing task #1, task manager 140 submits task #1 for execution by processing threads in pool 160.

In response to submitting task #1 for execution, monitor function 150 updates pool status information 152 to indicate that 10 processing threads are currently reserved for processing task #1 and that there are 2 free processing threads. Recall that execution of main task 210-1 can spawn execution of corresponding sub-tasks 211. For example, execution of the main task 210-1 by a corresponding processing thread results in the main task 210-1 initiating execution of sub-task 211-1, sub-task 211-2, and sub-task 211-3 by processing threads in pool 160. When executed by a respective processing thread in pool 160, sub-task 211-1 initiates execution of sub-task 211-4. When executed by a respective processing thread in pool 160, sub-task 211-3 initiates execution of sub-task 211-5, sub-task 211-6, and sub-task 211-7. When executed by a respective processing thread in pool 160, sub-task 211-6 initiates execution of sub-task 211-8 and sub-task 211-9.

After submitting task #1 for execution, assume that the task manager 140 attempts to submit task #2 for execution. Recall that task #2 requires up to 4 processing threads to complete. Prior to submitting task #2 for execution, the task manager 140 checks for un allocated processing threads 125 in pool 160 by querying monitor function 150. In this example, the monitor function 150 indicates that there are only two free processing threads in pool 160 and that the other 10 have been reserved for use by task #1. Task #2 requires up to 4 processing threads. Since there are fewer free processing threads than the maximum number of processing threads potentially required to execution task #2, the task manager 140 does not submit task #2 for execution.

Eventually, processing threads allocated or reserved for use by task #1 will free up as a result of respective processing threads in pool 160 completing corresponding sub-tasks and main task associated with task #1. For example, each time a respective processing thread completes execution of a main task or sub-task, the respective processing thread provides notification that the thread is free. Upon receiving the notification (or polling by the monitor function to identify when processing threads become free), the monitor function 150 modifies pool status information 150 to reflect the newly freed processing threads. That is, the monitor function 150 reduces the number of reserved processing threads by one and increases the number of free processing threads by one each time a respective processing thread completes execution of a respective sub-task or main task. These freed processing threads can then be reserved for use by other tasks.

Assume that two processing threads in pool 160 complete execution increasing the number of free or unreserved processing threads to 4. Recall that task #2 required up to 4 processing threads to execute main task 220-1 and corresponding sub-tasks 221 so there are now enough free processing threads to execute task #2 even if the main task 220-1 and all of the sub-tasks 221 happened to execute at the same time. Because there are now enough unreserved processing threads 125 available in pool 160, task manager 140 submits task #2 for execution by processing threads in pool 160.

In response to submitting task #2 for execution, monitor function 150 updates pool status information 152 to indicate that all 12 processing threads are currently reserved for processing task #1 a remainder of task #1 as well as task #2. There are currently no free processing threads.

Recall that execution of main task 220-1 can spawn execution of corresponding sub-tasks 221. For example, execution of the main task 220-1 by a corresponding processing thread results in the main task 220-1 initiating execution of sub-task 221-1. When executed by a respective processing thread in pool 160, sub-task 221-1 initiates execution of sub-task 221-2. When executed by a respective processing thread in pool 160, sub-task 221-2 initiates execution of sub-task 221-3.

Note that at any given time, only a portion of the reserved processing threads 125 in pool 160 may be currently used by the sub-tasks because not all may be executing at the same time. Reserving enough processing threads in advance eliminates a possibility of deadlock because the pool is not over committed with tasks.

Suppose that the task manager 140 now attempts to submit task #3 for execution. Currently, there are no unreserved processing threads in pool 160 because they are reserved for use by task #1 and task #2. After 7 processing threads free up as a result of executing sub-task associated with task #1 and task #2 as identified by pool status information 152, the task manager 140 can submit task #3 for execution by processing threads 125 in pool 160.

Thereafter, the task manager 140 can submit task #4 for execution when there are an appropriate number (e.g., one) processing threads free to execute the code associated with task #4, and so on.

Because monitor function 150 reserves (for submitted tasks) a maximum number of processing threads potentially required to execute each respective task, the task manager 140 does not submit an excessive number of tasks to pool 160. This prevents occurrence of a deadlock condition in which none of any submitted tasks are able to complete because there are no free processing threads.

As an example illustrating dead-lock, suppose that the task manager 140 happened to simultaneously execute 12 tasks in parallel and each of the submitted tasks required one or more processing threads to execute corresponding one or more respective sub-tasks. None of the twelve submitted tasks would be able to complete execution because they would each be waiting for another processing thread to free up to execute their corresponding sub-tasks.

As discussed above, embodiments herein include reserving enough processing threads ahead of time (without actually keeping track of when the reserved processing threads in pool will actually be used by the processing threads) to guarantee that a respective task can be completed. Multiple processing threads are simultaneously reserved for use by the task upon submission of the task while the number of reserved processing threads is reduced each time a processing thread completes execution of a corresponding sub-task associated with the task.

Because processing threads 125 in pool 160 are reserved for use (as identified by pool status information 152) by submitted tasks as discussed above, the pool 160 can include a predetermined or fixed number of processing threads 125.

Again, note that the task manager 140 can submit tasks for execution depending on a number of free, unreserved processing threads available in pool 106. For example, suppose that task manager has 5 unreserved available processing threads in pool 160 and a next task in the queue requires (as a worst case condition) up to 8 processing threads to execute. In such an instance, the task manager 140 can skip through the queue to find another task (e.g., one requiring 5 or fewer processing threads) that can be run in lieu of the task requiring 8 processing threads. Thus, smaller tasks (e.g., a task requiring fewer processing threads) can be submitted in lieu of larger tasks.

Variations and Additional Embodiments

As previously discussed, the tasks submitted by task manager 140 can be composite tasks. A composite task is a task consisting of one or more subtasks, any of which could also be a composite task.

A composite task may have an associated execution strategy that specifies whether the subtasks are to be executed sequentially or in parallel. Composite tasks with a sequential execution strategy can execute each subtask in the same thread as the parent composite task, while composite tasks with a parallel execution strategy execute each of its subtasks in a separate thread. In such an embodiment, the task manager 140 and monitor function 150 need not reserve a processing thread for each main task and corresponding sub-task in the given task being analyzed. Instead, the task manager 140 can analyze each of multiple respective tasks and identify sub-tasks that can be executed serially versus parallel to determine a maximum number of required processing threads to execute a respective task.

As an example, referring to task #1 in FIG. 2, assume that sub-tasks 211-1, 211-2, 211-3 are tagged to be executed in parallel, sub-tasks 211-5, 211-6, and 211-7 are tagged to be executed in parallel, and sub-tasks 211-8 and 211-9 are tagged to be executed in parallel. Assume that sub-task 211-4 is tagged for serial execution. In this example embodiment, sub-task 211-4 can be executed by the same processing thread as sub-task 211-1. Thus, the task manager task manager 140 need only reserve a single processing thread to execute sub-task 211-1 and sub-task 211-4 as opposed to reserving 2 processing threads as discussed above.

Assume that each of sub-task 221-1, sub-task 221-2, and sub-task 221-3 are tagged for serial execution. Accordingly, when submitting task #2 for execution, the task manager 140 can reserve a single processing thread to execute each of main task 220-1, sub-task 221-1, sub-task 221-2, and sub-task 221-3.

In a similar vein, sub-task 231-1 and 231-6 can be tagged for serial execution while sub-task 231-2, sub-task 231-3, sub-task 231-4 and sub-task 231-5 can be tagged for parallel execution. Under these circumstances, the maximum number of required processing threads as identified by task manager 140 will be 5 instead of 7 as discussed above. Accordingly, when submitting task #3 for execution, the task manager 140 can reserve a single processing thread to execute main task 230-1 and sub-task 231-1, a respective processing thread to execute sub-task 231-2, a respective processing thread to execute sub-task 231-3 and sub-task 231-6, a respective sub-task 231-4 to execute sub-task 231-4, and a respective processing thread to execute sub-task 231-5.

As mentioned above, when a system concurrently executes multiple, arbitrarily complex composite tasks on a fixed-size thread pool, it is quite easy for the system to dead-lock on threads. In a dead-lock situation, all executing composite tasks are waiting for one or more threads from the fixed-size thread pool to become available and cannot continue execution until the threads are acquired. In such a situation, no threads will ever become available and the system is in a hung state.

To prevent dead-locks in this environment, a thread reservation service is created that manages the availability of the threads in the fixed-size thread pool. Prior to executing any top-level task (i.e., a main task or a task that has no parent task), the system determines the total number of threads required to execute the task, including all of its subtasks.

The system then calls the thread reservation service to see if there are currently enough free threads in the thread pool to ensure complete execution of the task. If there are not enough free threads, the task is not allowed to execute at that time. If there are enough free threads in the thread pool to execute the task, the thread reservation system reserves that number of threads in the thread pool for use by that task.

The thread reservation system also keeps track of every task that has a thread reserved for its execution. No task is allowed to execute on the thread pool if it does not have a reservation with the thread reservation service. As tasks are executed and completed, their threads are freed and their thread reservations are cancelled. With the thread reservation service fronting the fixed-size thread pool the system will never dead-lock, because all threads required for task execution are reserved ahead of time. As mentioned above, the number of processing threads reserved for task execution can depend on which portions of a task are executed by the same processing thread and which are executed by different processing threads.

Figure 4:
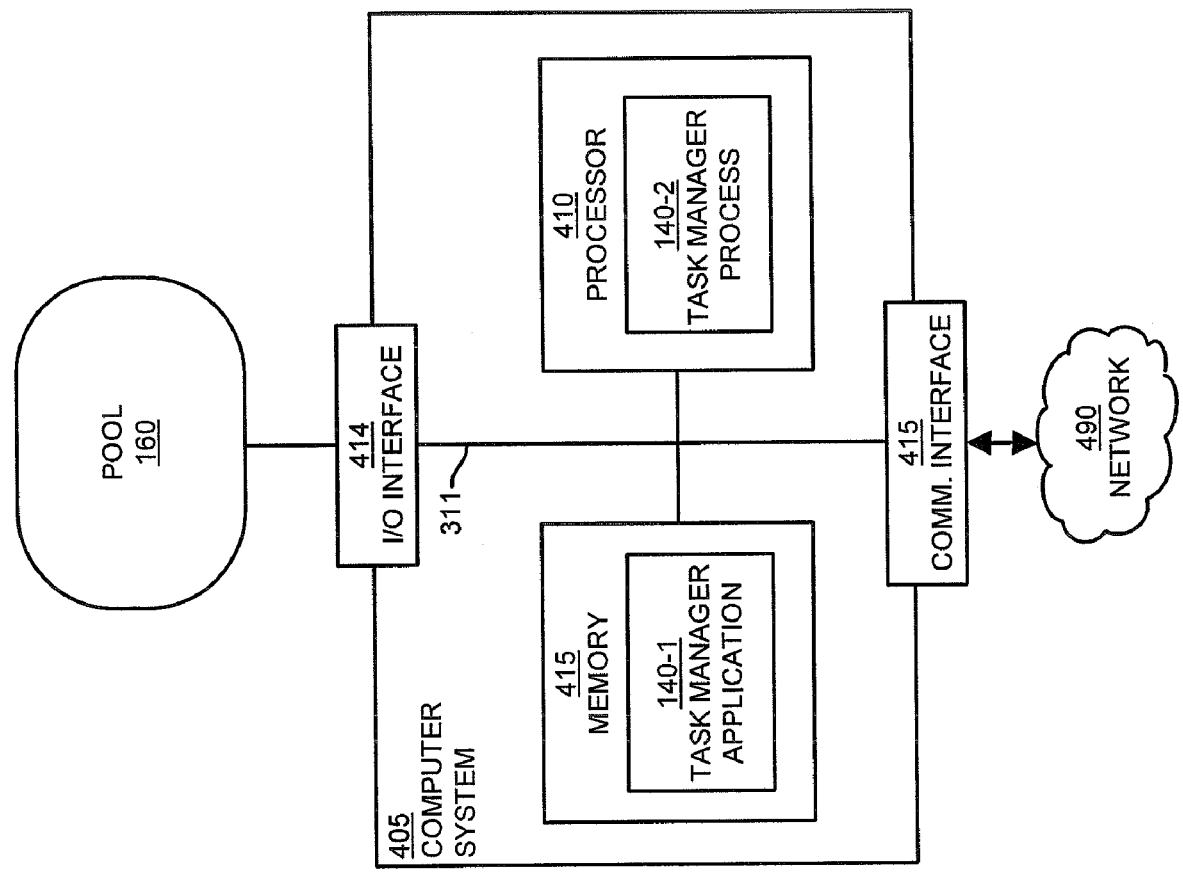
FIG. 4 is an example block diagram of a processing device suitable for executing a respective task manager and related functions according to embodiments herein.

FIG. 4 is a block diagram illustrating an example computer system 405 for executing task manager 140 and related functions/processes according to embodiments herein. Computer system 405 may be a computerized device such as a personal computer, workstation, portable computing device, console, network terminal, processing device, etc.

As shown, computer system 405 of the present example includes an interconnect 411 that couples a memory system 415, a processor 410, an I/O interface 414, and a communications interface 415. I/O interface 414 enables computer system 405 to submit tasks (or portions thereof) for execution by pool 160. Communications interface 415 of computer system 405 enables computer system 405 to communicate over network 490 to transmit and receive information from different resources as is needed to carry out task management according to embodiments herein.

As shown, memory system 415 is encoded with compliance task manager application 140-1 supporting submission of tasks for execution as well as generation of graphical user interface and other functions according to embodiments herein. Task manager application 140-1 can be embodied as software code such as data and/or logic instructions (e.g., code stored in the memory or on another computer readable medium such as a disk) that support functionality according to different embodiments described herein.

Note that other functionality associated with task manager 140 such as monitor function 150 as described herein also can be encoded as software that operates on a computer system 405 to carry out embodiments herein.

Referring again to the task manager 140 example, during operation of task manager application 140-1, processor 410 accesses memory system 415 via the interconnect 411 in order to launch, run, execute, interpret or otherwise perform the logic instructions of the task manager application 140-1. Execution of the task manager application 140-1 produces processing functionality in task manager process 140-2. In other words, the task manager process 140-2 represents one or more portions of the task manager application 140-1 (or the entire application) performing within or upon the processor 410 in the computer system 405.

It should be noted that task manager process 140-2 executed in computer system 405 can be represented by either one or both of the task manager application 140-1 and/or the task manager process 140-2. For purposes of this discussion and different embodiments herein, general reference will again be made to the task manager 140 as performing or supporting the various steps and functional operations as previously discussed and as will be discussed further in this specification.

As mentioned, in addition to the task manager process 140-2, embodiments herein include the task manager application 140-1 itself (i.e., the un-executed or non-performing logic instructions and/or data). The task manager application 140-1 may be stored on a computer readable medium such as a floppy disk, hard disk, or optical medium. The task manager application 140-1 may also be stored in a memory type system such as in firmware, read only memory (ROM), or, as in this example, as executable code within the memory system 415 (e.g., within Random Access Memory or RAM). In addition to these embodiments, it should also be noted that other embodiments herein include the execution of task manager application 140-1 in processor 410 as the task manager process 140-2. Thus, those skilled in the art will understand that the computer system 405 may include other processes and/or software and hardware components, such as an operating system that controls reservation and use of hardware resources.

Functionality supported by task manager 140 and other resources will now be discussed via flowcharts in FIGS. 5-8.

Figure 5:
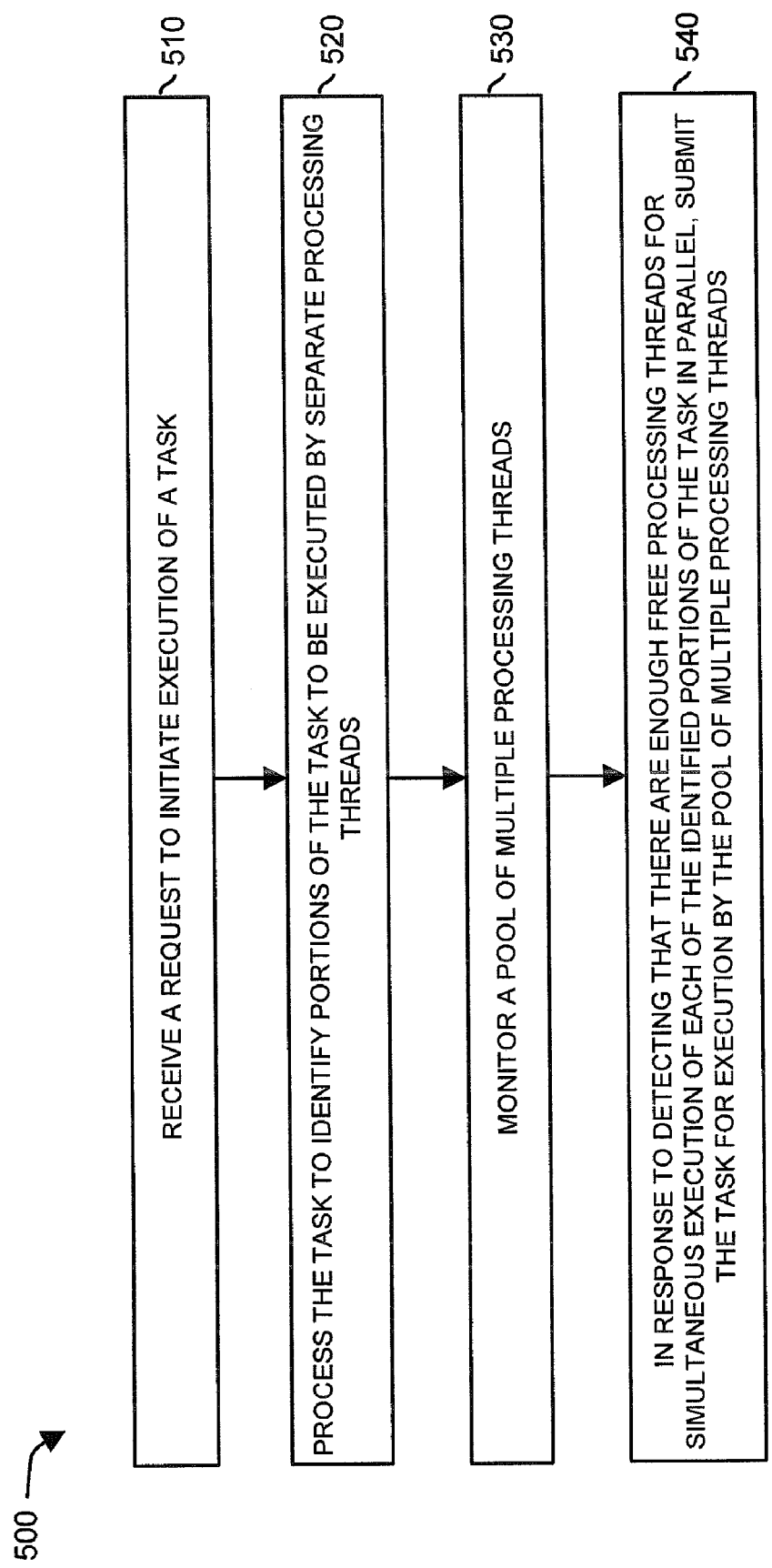
FIGS. 5, 6, 7 and 8 are example flowcharts illustrating management of executing tasks according to embodiments herein.

Now, more particularly, FIG. 5 is a flowchart 500 illustrating a technique of task management and execution according to embodiments herein. Note that techniques discussed in flowchart 500 may overlap with the techniques discussed above.

In step 510, the task manager 140 receives a request to initiate execution of a given task.

In step 520, the task manager 140 processes (e.g., analyzes or parses) the given task to identify portions of the given task to be executed by separate processing threads.

In step 530, the task manager 140 monitors the pool of multiple processing threads to detect when reserved processing threads become free as a result of completing execution of a corresponding task or sub-task.

In step 540, the task manager 140 submits the given task for execution by the pool of multiple processing threads in response to detecting that there are enough free processing threads for simultaneous execution of each of the identified portions of the task in parallel. For example, according to one embodiment, in response to detecting that a sufficient number of processing threads have freed up in the pool as a result of completing a main task or corresponding one or more sub-tasks associated with a previous task submitted for execution by the pool and that there are now a sufficient number of free processing threads available in the pool to execute portions of the given task in parallel, the task manager 140 submits the task for execution by the pool of multiple processing threads.

Figure 6:
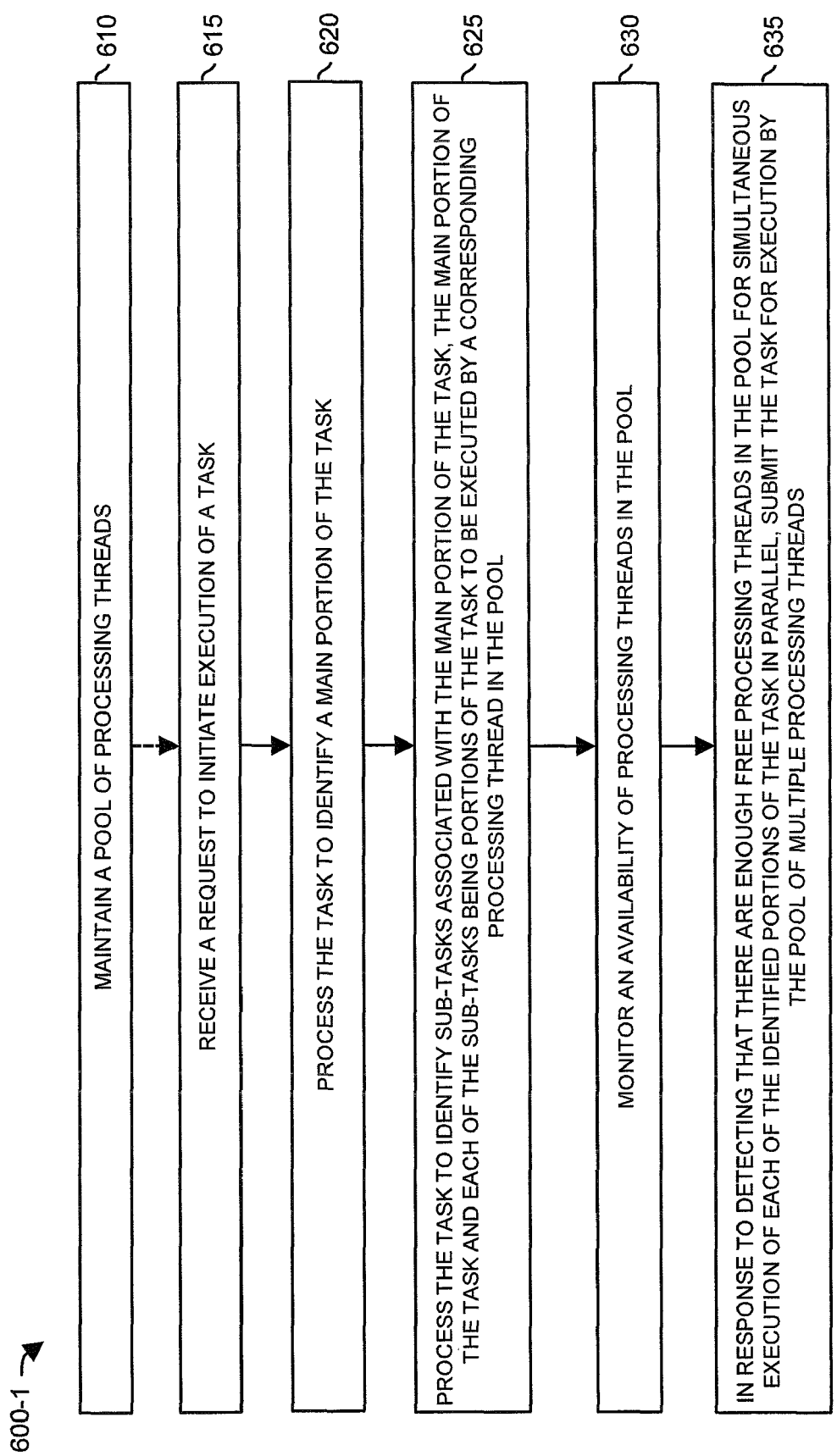
Figure 7:
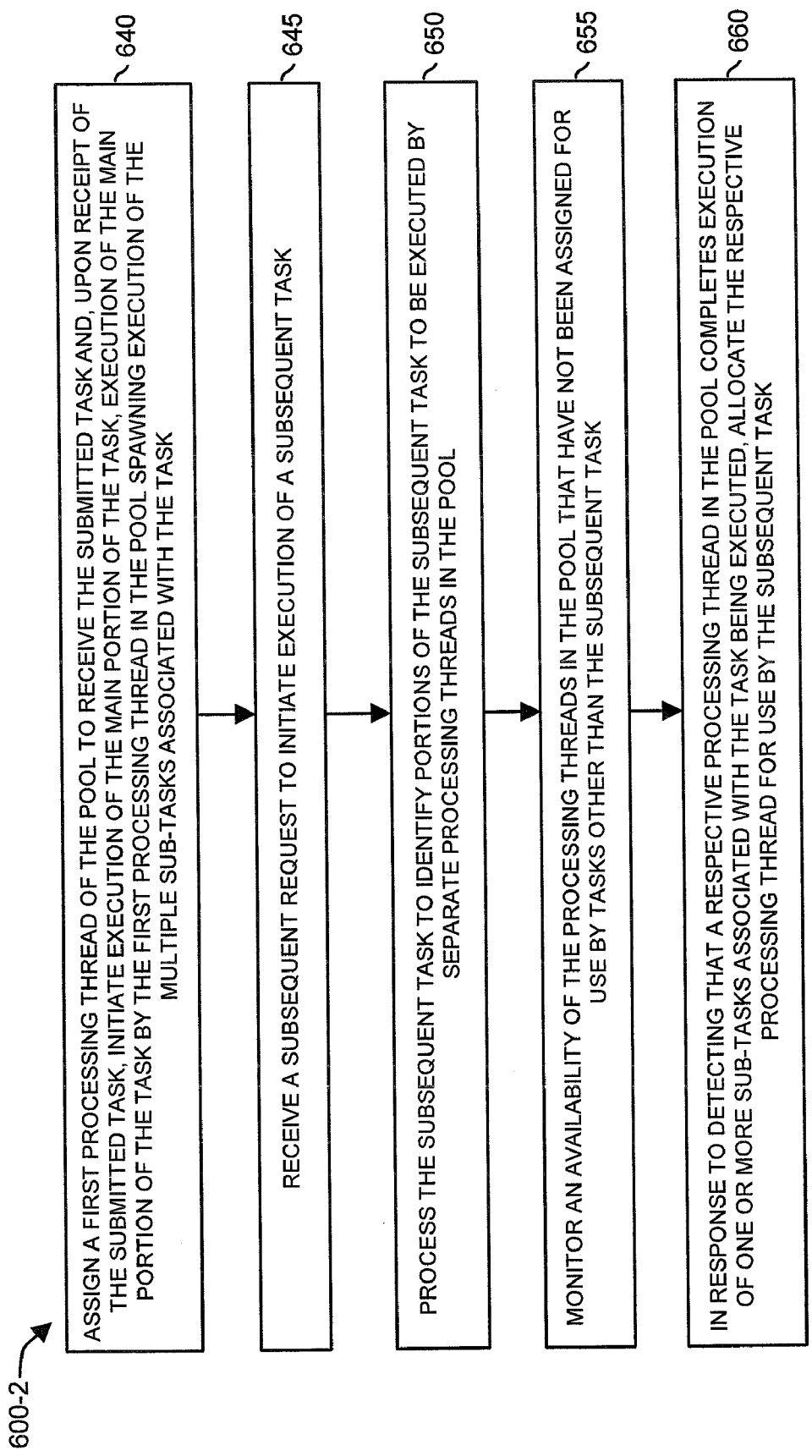

FIGS. 6 and 7 combine to form a detailed flowchart 600 (e.g., flowchart 600-1 and flowchart 600-2) illustrating techniques for task management according to embodiments herein. Note that techniques discussed in flowchart 600 overlap with the techniques discussed above.

In step 610, the task manager 140 maintains a pool of processing threads.

In step 615, the task manager 140 receives a request to initiate execution of a task.

In step 620, the task manager 140 processes the task to identify a main portion of the task, the main portion of the task spawning sub-tasks for execution when executed by a processing thread in the pool.

In step 625, the task manager 140 processes the task to identify sub-tasks associated with the main portion of the task, the main portion of the task and each of the sub-tasks being portions of the task to be executed by a corresponding processing thread in the pool.

In step 630, the task manager 140 monitors an availability of processing threads in the pool.

In step 635, in response to detecting that there are enough free processing threads in the pool for simultaneous execution of each of the identified portions of the task in parallel, the task manager 140 submits the task for execution by the pool of multiple processing threads. In one embodiment, submitting the task for execution can include submitting the main task for execution by a processing thread in the pool. As previously discussed, execution of the main task can spawn execution of each of the sub-tasks associated with the main task by other reserved processing threads in the pool. In other embodiments, however, note that the task manager submits the main task and corresponding sub-tasks for execution by processing threads in pool 160 in lieu of the threads spawning execution of other sub-tasks.

In step 640, the task manager 140 assigns a first processing thread of the pool to receive and execute a main portion of the submitted task. Upon receipt of the submitted task, the first processing thread initiates execution of the main portion of the task. As mentioned above, execution of the main portion of the task by the first processing thread in the pool results in the spawning and subsequent execution of the multiple sub-tasks associated with the task.

In step 645, the task manager 140 receives a subsequent request to initiate execution of a subsequent task.

In step 650, the task manager 140 processes the subsequent task to identify portions of the subsequent task to be executed by separate processing threads in the pool.

In step 655, the task manager 140 monitors an availability of the processing threads in the pool that have are not currently reserved or assigned for use by tasks other than the subsequent task.

In step 660, in response to detecting that a respective processing thread in the pool completes execution of one or more sub-tasks associated with the task being executed and there are enough free processing threads to execute the subsequent task, the task manager 140 allocates the respective processing thread for use by the subsequent task.

Figure 8:
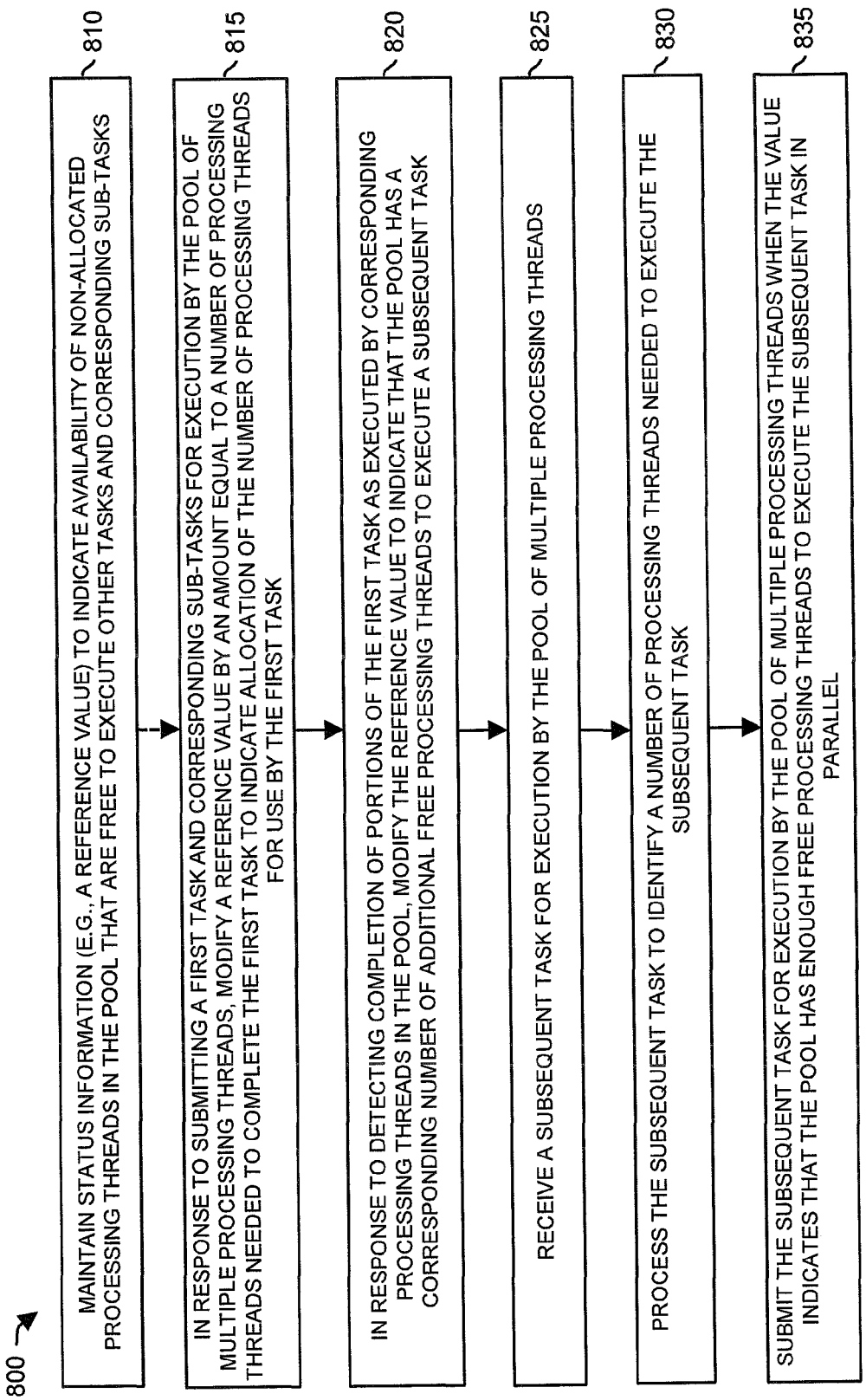
Figure 9A:
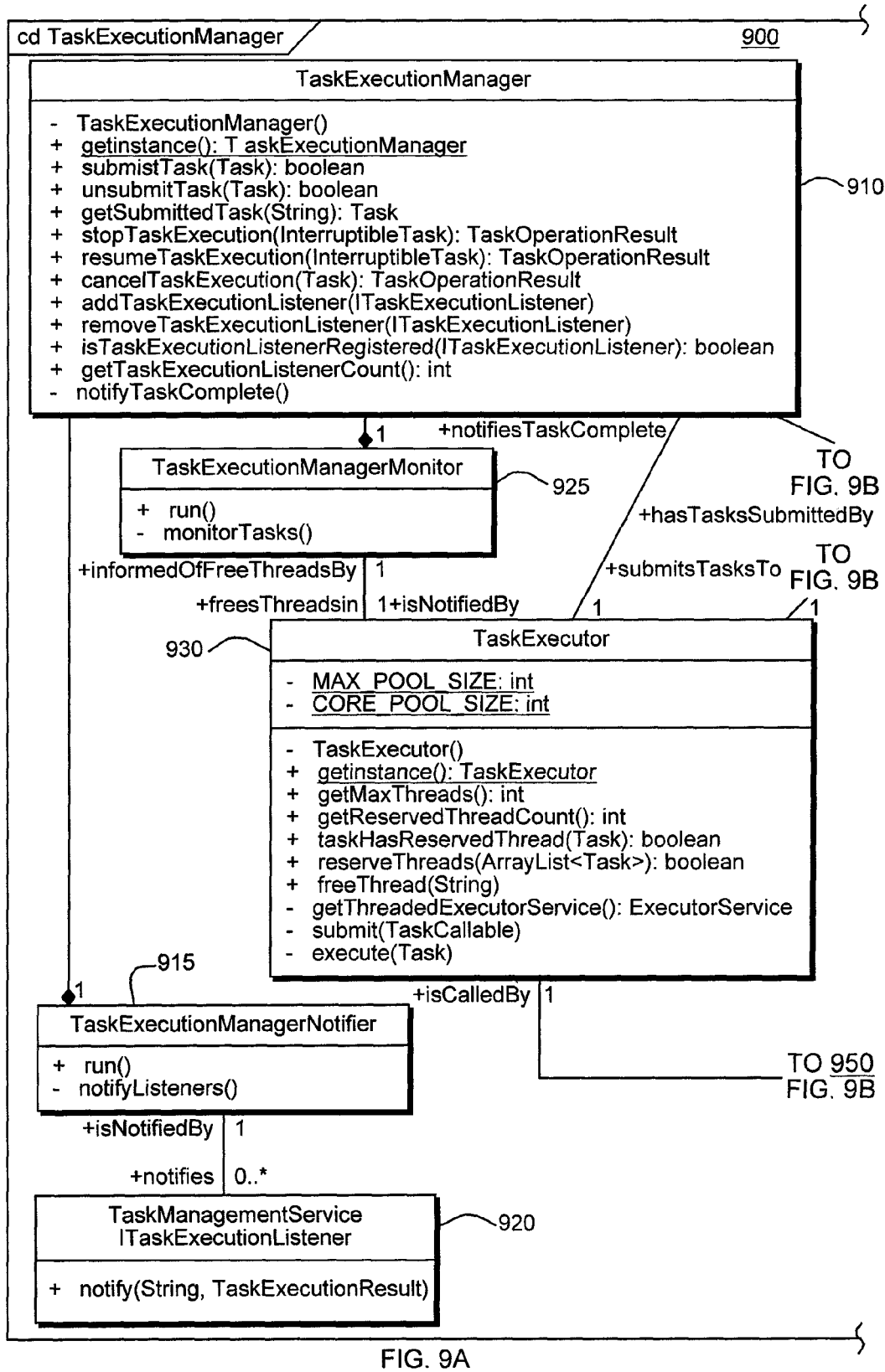
FIGS. 9A and 9B are example diagrams of a task execution manager according to embodiments herein.
Figure 9B:
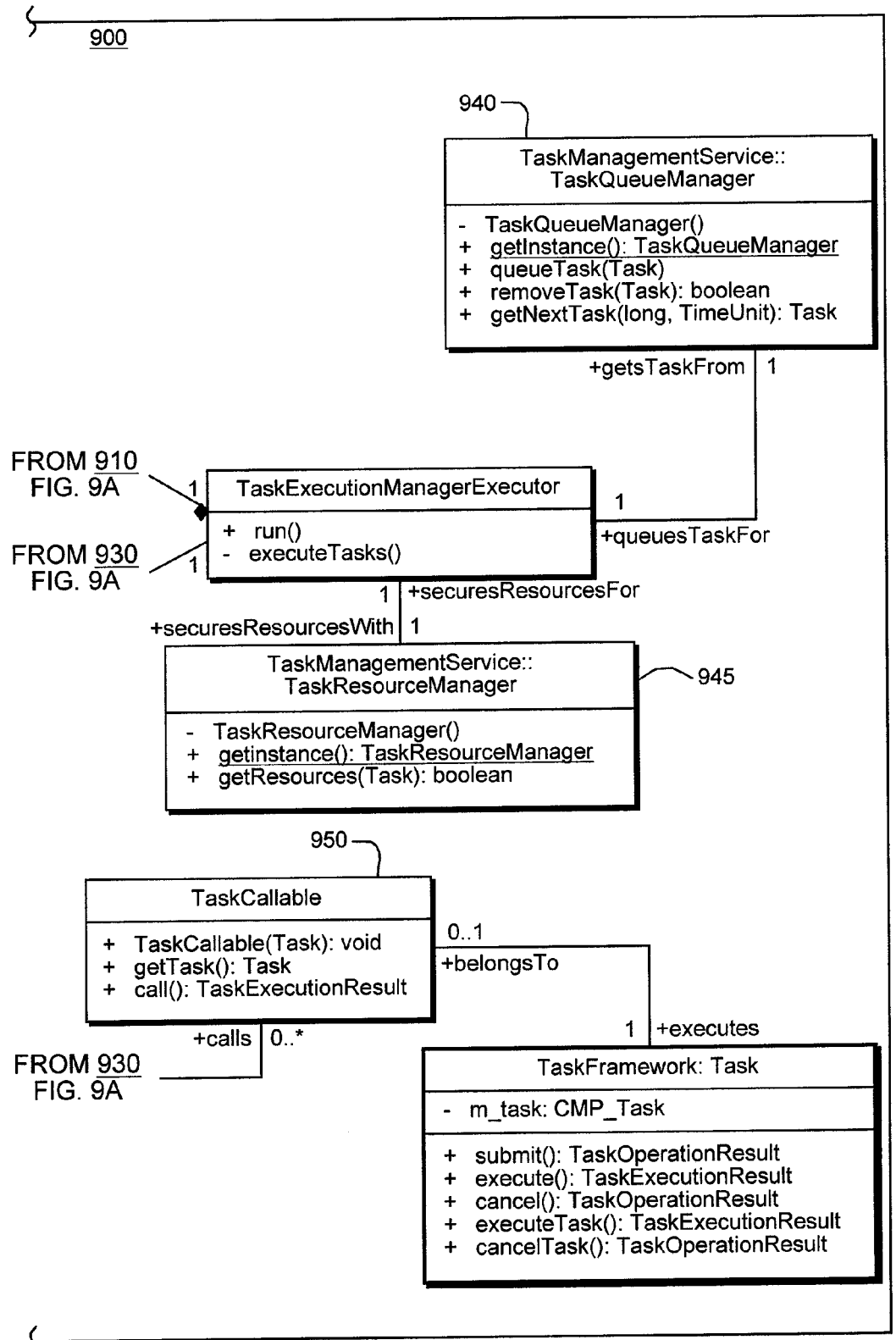
Figure 10A:
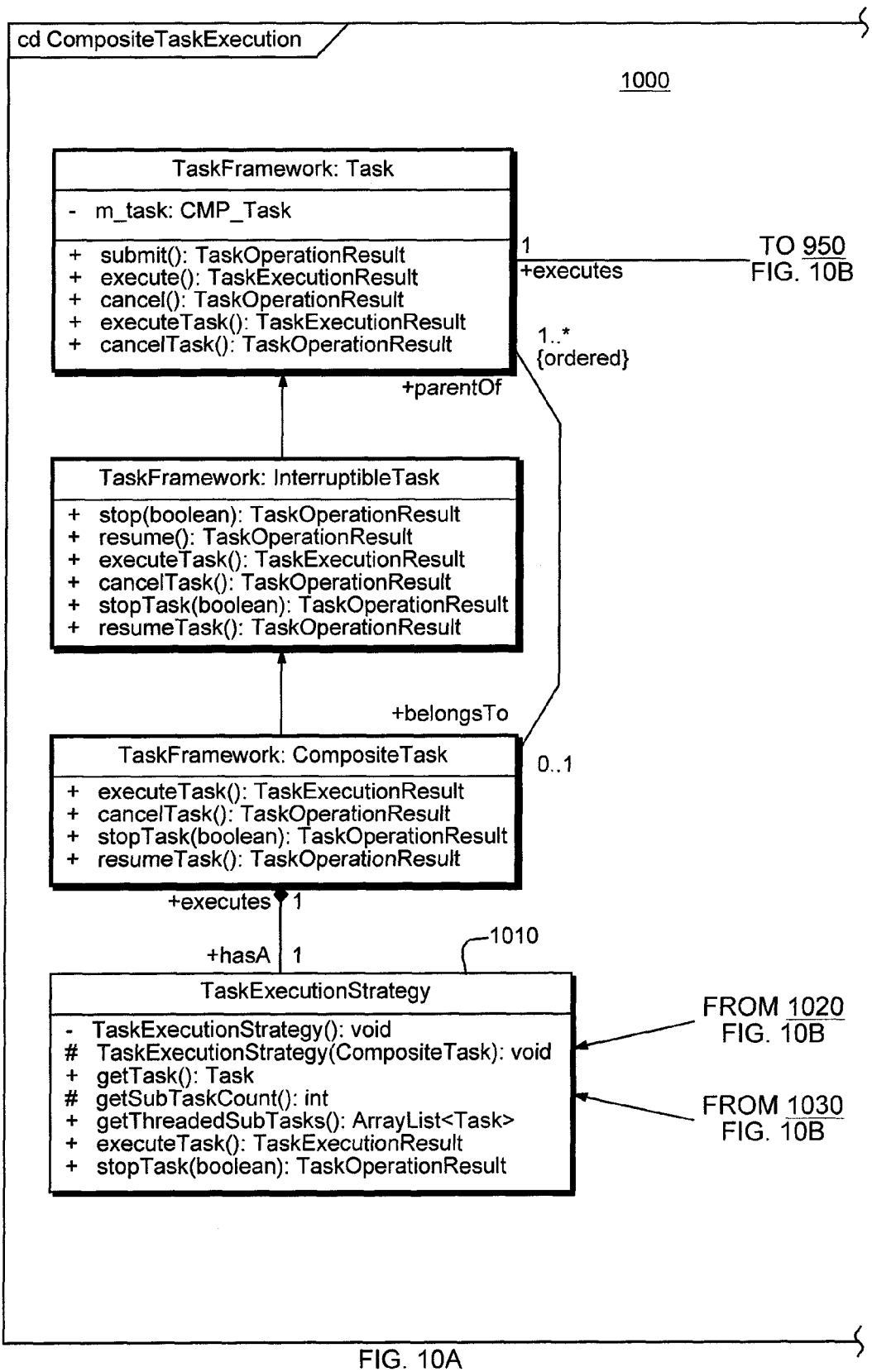

FIG. 8 is a detailed flowchart 800 illustrating task execution and task management according to embodiments herein. Note that techniques discussed in flowchart 600 overlap with the techniques discussed above in the previous figures.

In step 810, the monitor function 150 maintains status information (e.g., a reference value) to indicate availability of non-allocated processing threads in the pool that are free to execute other tasks and corresponding sub-tasks.

In step 815, in response to the task manager 140 submitting a first task and corresponding sub-tasks for execution by the pool of multiple processing threads, the monitor function 150 modifies a reference value by an amount equal to a number of processing threads needed to complete the submitted task to indicate allocation of the number of processing threads for use by the submitted task.

In step 820, the task manager 140 in response to detecting completion of portions of the first task as executed by corresponding processing threads in the pool, modifies the reference value to indicate that the pool has a corresponding number of additional free processing threads to execute a subsequent task.

In step 825, the task manager 140 receives a subsequent task for execution by the pool of multiple processing threads.

In step 830, the task manager 140 processes the subsequent task to identify a number of processing threads needed to execute the subsequent task.

In step 835, the task manager 140 submits the subsequent task for execution by the pool of multiple processing threads when the value is reduced and eventually indicates that the pool has enough free processing threads to execute the subsequent task in parallel.

FIGS. 9A, 9B, 10A, 10B, and 10C are example diagrams of an environment 900 and 1000 supporting task management and execution according to embodiments herein.

In general, TaskExecutionManager 910 manages task execution, updates task state, and provides the task execution result.

The TaskQueueManager 940 manages a priority based task execution queue.

The TaskResourceManager class 945 is responsible for reserving the resources required to successfully execute a given task.

The TaskExecutor 930 is responsible for executing all tasks.

The TaskCallable class 950 is a wrapper class for tasks that are submitted to the TaskExecutor for execution is a separate thread.

The ParallelTaskCompletionService class is capable of executing multiple tasks simultaneously in separate threads and waiting for each of the tasks to complete.

An instance of an ITaskExecutionListener 920 can be registered with the TaskExecutionManager 910 and will be notified as tasks complete execution.

Task Execution Design

In order to provide a sufficient level of performance, the Task Management Service executes tasks in a multi-threaded environment. The Task Management Service utilizes a configurable thread pool when executing tasks. Using a configurable thread pool allows the Task Management Service to balance the need for task execution performance with the consumption of server resources. This section describes the components in the Task Management Service involved in multi-threaded task execution.

TaskExecutionManager

The singleton TaskExecutionManager class is responsible for executing the top-level tasks submitted to the Task Management Service and informing registered listeners when all executed tasks complete. The task execution manager is also responsible for executing top-level task that were stopped and subsequently resumed. When the task execution manager is started, the task execution manager creates three private Runnable service class instances and starts them in 3 independent threads. Each of these private services plays a distinct role in the execution of a task, as shown and described below.

TaskExecutionManagerMonitor—The monitor continuously checks for the completion of top-level tasks that have been executed by the task execution manager.

When a top-level task completes, the monitor adds the task to the completed tasks queue and frees the thread on which the top-level task was executed.

TaskExecutionManagerNotifier—The notifier 915 continuously checks the completed tasks queue and when a task is added to the queue, notifies any registered task completion listeners that the task has completed. The completed task queue can contain any task executed by the task execution manager including all subtasks of top-level tasks that are composite tasks. We purposely separated the responsibilities of the monitor 925 and notifier 915 so that threads are freed as quickly as possible and there is no latency waiting for client listener code to execute.

TaskExecutionManagerExecutor—The executor 930 continuously requests the next task to be executed from the TaskQueueManager 940. When one is ready to be executed, the executor asks the TaskResourceManager 945 to reserve the resources required to execute the task, where one of the resources is the threads (Composite tasks require multiple threads when it has a parallel execution strategy) required to execute the task. If the resources can be reserved, the task is submitted to the TaskExecutor 930 for execution. If the resources cannot be reserved, the task is handed back to the TaskQueueManager 940.

As discussed above, by reserving the threads required to execute the task in advance, we are sure that the task will have the necessary server resources. Also, by disallowing tasks when the required threads cannot be reserved ahead of time, we are sure that we will never dead lock waiting for threads to become available.

TaskQueueManager

The singleton TaskQueueManager class 940 is responsible for managing all tasks that are ready for execution, prioritizing them, and determining the task that should be executed next. The tasks managed by the task queue manager may include tasks that were submitted for immediate execution, scheduled tasks that are now ready to execute, previously executed tasks that were stopped, and tasks for which the resources required for the task are not yet available. The TaskExecutionManager 910 continuously queries the task queue manager for the next task to execute, and when one is ready, the TaskExecutionManager 910 attempts to execute the task.

TaskResourceManager

The singleton TaskResourceManager class 945 is responsible for reserving the resources required to successfully execute a given task. Before the TaskExecutionManager 910 submits a task for execution to the TaskExecutor 930, it uses the task resource manager to reserve the resources required by the task to be executed. Currently, the task resource manager only attempts to reserve the thread resources required by the task from the TaskExecutor 930. The task resource manager informs the TaskExecutionManager 910 whether or not the resources were successfully reserved. If so, the TaskExecutionManager 910 will submit the task for execution, otherwise the task is handed back to the TaskQueueManager 940. In the future, the task resource manager will also attempt to secure the reservations required by the task.

TaskExecutor

The singleton TaskExecutor class 930 is responsible for executing all tasks. It is responsible for executing the top-level tasks submitted for execution by the TaskExecutionManager 910. It is also responsible for executing the subtasks of top-level tasks that are composite tasks. Tasks executed by the task executor can be executed in the current thread or alternatively in a separate thread. For tasks executed in separate threads, the task executor uses a standard Java ThreadPoolExecutor to execute tasks on a configurable, fixed-size thread pool.

The TaskExecutor 930 also provides the ability to reserve/unreserve the threads in the thread pool of its ThreadPoolExecutor ahead of time. Before any top-level task can be executed, the TaskResourceManager 945 must first reserve all threads required to execute the task. If there are not enough free threads, then the task cannot be executed until previously executed tasks complete and their threads are freed. If a request is made to execute a task in a separate thread and the task does not have a thread reserved for it, the request is ignored and an error is logged.

TaskCallable

The TaskCallable class 950 is a wrapper class for tasks that are submitted to the TaskExecutor 910 for execution is a separate thread. The java ThreadPoolExecutor used by the TaskExecutor 910 expects submitted tasks to implement either the Java Runnable or Callable interface. The Callable interface was chosen because it is capable of returning a result, in this case, the TaskExecutionResult resulting from the task execution. When the TaskCallable 950 instance is submitted to the TaskExecutor 930, the TaskCallable 950 call( ) method is invoked, which in turn calls the execute( ) method of the wrapped Task.

Composite Task Execution

A CompositeTask delegates execution of the task to the TaskExecutionStrategy 1010 associated with the CompositeTask. The TaskExecutionStrategy 1010 knows how the subtasks of the CompositeTask should be executed. Currently there are two distinct execution strategies, the SerialExecutionStrategy 1020 and the ParallelExecutionStrategy 1030.

The SerialExecutionStrategy 1020 executes the subtasks in a serial manner in the same thread in which the CompositeTask is executing. The ParallelExecutionStrategy 1030 executes the subtasks in a parallel manner where each subtask executes in a different thread. Task execution for these strategies in described below in more detail.

Serial Execution Strategy

The SerialExecutionStrategy 1020 in the Task Model executes the subtasks in a serial manner in the same thread in which the CompositeTask is executing. The SerialExecutionStrategy 1020 loops through the subtasks and delegates execution of each subtask to the TaskExecutor 930. The TaskExecutor 930 simply executes the task and when it completes, notifies the TaskExecutionManager 910 that the task has completed. Because the subtasks are executed serially and because no new threads are created to execute the subtasks, each subtask will execute and complete in order, and when all subtasks have completed, the CompositeTask will be completed.

Parallel Execution, ParallelTaskCompletionService

The ParallelExecutionStrategy 1030 in the Task Model delegates execution of the subtasks of a CompositeTask to the ParallelTaskCompletionService 1040. The ParallelTaskCompletionService class 1040 is capable of executing multiple tasks simultaneously in separate threads and waiting for each of the tasks to complete. The ParallelTaskCompletionService 1040 uses the ThreadPoolExecutor from the TaskExecutor 930 to execute the set of tasks in parallel.

As each task completes, the ParallelTaskCompletionService 1040 frees the thread in which the subtask was executed and then notifies the TaskExecutionManager 910 that the subtask completed. Once all subtasks have completed, the CompositeTask will be completed. Note that because the subtasks are executed in parallel in separate threads the order of completion is indeterminate. However, the ParallelTaskCompletionService 1040 ensures that the CompositeTask will not complete until all subtasks have completed.

Stopping Task Execution

The task model provides the CMP_InterruptibleTask class, which defines a simple task that may be paused (i.e., stopped) and subsequently resumed. Applications may extend CMP_InterruptibleTask for any task for which the application can provide the semantics to pause and subsequently resume the task. For example, an application may extend CMP_InterruptibleTask for a long running task that the application has the ability to pause and subsequently resume. To support this, the framework provides the stopTask( ) method for CMP_InterruptibleTask. The application must implement the stopTask( ) method provided by CMP_InterruptibleTask to pause the task, and it is up to the application to maintain the context of the task execution at the time the task was stopped.

The task model also provides CMP_CompositeTask, which is an interruptible task and extends CMP_InterruptibleTask. In this case, the framework defines the semantics for stopping the task by implementing the stopTask( ) method, and the framework maintains the execution context at the time the composite task was stopped. The framework can only stop composite tasks with a serial execution strategy. For a serial composite task consisting of only simple non-interruptible subtasks, the currently executing simple subtask runs to completion at which point the framework stops any further subtasks from executing.

In one embodiment, only tasks that extend CMP_InterruptibleTask are capable of being stopped. Also, for nested composite tasks and composite tasks with application defined interruptible subtasks, the framework forwards the stop request to all interruptible subtasks in the task hierarchy, so that any and all tasks cable of being stopped are given the chance to stop.

When a stop task request is made to the Task Management Service, the request is forwarded to the TaskExecutionManager 910, which in turn delegates the request to the InterruptibleTask via the stop( ) method. The stop( ) method then delegates the stop request to the TaskState representing the current state for the task. If the task is in a state in which it is capable of being stopped (i.e., it is currently executing), the TaskState delegates the request back to the InterruptibleTask via the stopTask( ) method. If the interruptible task is a CompositeTask, the framework stops the task execution. The CMP_TaskOperationResult returned by the framework will indicate whether or not the stop request was successful. In addition, the CMP_TaskExecutionResult returned by the framework will indicate that execution was stopped. If the interruptible task is an application defined interruptible task, the stopTask( ) method of the application defined CMP_InterruptibleTask is invoked to stop the task execution.

According to one embodiment, the CMP_TaskOperationResult returned by the application task must indicate whether or not the task was or will be successfully stopped. If success is returned, the task execution must be stopped so that the thread being utilized to execute the task is freed. The CMP_TaskExecutionResult returned by the executeTask( ) method for the application defined CMP_InterruptibleTask must indicate that the execution was stopped. That is, the executionStatus attribute of the CMP_TaskExecutionResult must be set to EXECUTION_STOPPED. The framework uses this information from the application results to set the appropriate state for the task.

Resuming Task Execution

A task that was successfully stopped may subsequently be resumed at the point in which it was stopped. This implies that only tasks that extend CMP_InterruptibleTask may be resumed. When a resume task request is made to the Task Management Service, the request is forwarded to the TaskExecutionManager 910, which in turn delegates the request to the InterruptibleTask via the resume( ) method. The resume( ) method then delegates the resume request to the TaskState representing the current state for the task. If the task is in a state in which it is capable of being resumed (i.e., it is currently stopped), the TaskState delegates the request back to the InterruptibleTask via the resumeTask( ) method.

Regardless of whether the interruptible task is a CompositeTask or an application defined interruptible task, the resumeTask( ) method updates the task state and resubmits the task for execution to the TaskExecutionManager 910. The application does not implement resumeTask( ) for the corresponding CMP_InterruptibleTask as it did stopTask( ). The framework behaves exactly as if the task is being submitted for execution the first time. This means that the executeTask( ) method will be invoked to resume task execution. Therefore, for an application task that extends CMP_InterruptibleTask, the application must maintain some execution context when the task is stopped and use this in the implementation of executeTask( ) so it knows whether the task should executed from the beginning or from a point at which it was previously stopped. The framework takes care of this for composite tasks.

Canceling Task Execution

Tasks may be canceled while in one of several states. All top-level tasks in the CREATED, SUBMITTED, and EXECUTION_STOPPED states may be canceled. In these cases, the task is simply transitioned to the CANCELED state. A Task in the EXECUTING state may be canceled only when the task is an interruptible task i.e., it extends CMP_InterruptibleTask. In the case of an executing task, the cancel request must stop the task execution. Since only interruptible tasks may be stopped, a task that is executing must be an interruptible task in order to be canceled.

For an executing CompositeTask, the framework again defines the semantics for canceling the task, and it is much the same as the semantics for stopping the task execution. In fact, when the cancel request is received, the framework issues a stop request to the CompositeTask. If the stop request is successful, the task will temporarily be transitioned to the EXECUTION_STOPPED state. The framework then re-issues the cancel request to the now stopped CompositeTask. This will cause the task to transition to the CANCELED state. So, in a successful cancellation of an executing CompositeTask, the task will make two state transitions, one from EXECUTING to EXECUTION_STOPPED and a second from EXECUTION_STOPPED to CANCELED.

Even though the framework issues a stop request to stop the task execution, the CMP_TaskExecutionResult returned when the execution is successfully stopped will indicate that the execution was canceled not stopped. That is, the executionStatus attribute of the CMP_TaskExecutionResult is set to EXECUTION_CANCELED. The framework differentiates between a regular stop request and stop request made in the process of a cancel request.

For an executing application defined CMP_InterruptibleTask, the framework invokes the cancelTask( ) method of the application defined CMP_InterruptibleTask to cancel the task execution. The CMP_TaskOperationResult returned by the application must indicate whether or the task will be successfully canceled. If success is returned, the application must stop the execution of the task. In addition, the CMP_TaskExecutionResult returned by the application must indicate that the task execution was canceled not stopped. That is, the executionStatus attribute of the CMP_TaskExecutionResult must be set to EXECUTION_CANCELED.

The implementation of cancelTask( ) for the application defined CMP_InterruptibleTask will likely use the implementation for stopTask( ) to stop the task execution. However, in the case of a cancel request, there is no need to save any execution context, because the canceled task cannot be resumed. Note also, that in the case of canceling the task execution, the CMP_TaskExecutionResult must indicate that the execution was canceled, not stopped. The framework uses this information to transition the task to the correct state.

According to one embodiment, tasks that are canceled cannot be resumed. However, the task may be executed again from the beginning by resubmitting the task for execution.

Percentage Done Monitor

In one embodiment, the environment 100 can be configured to include a module that produces a calculation of the percentage done of running tasks. This can be accomplished by a combination of estimates provided by a probe mechanism and a periodic calculation done by the Task Manager component TaskMonitor. The probe will provide estimates of the percentage done of simple tasks and of the relative size (weight) of simple tasks and composite tasks. The Task Manager will use these estimates to calculate the percentage done of composite tasks (which includes the root task). This is explained in more detail in the next section.

TaskMonitor starts a thread that subscribes to changes in the weight and percentageDone attributes of CMP_Task objects. The thread periodically checks for events, and recomputes the percentage done value for affected composite tasks.

Each CMP_Task has two attributes:
1. percentageDone
2. weight

The percentage done of a given task is just what the name implies. It is a measure of how close to completion a task is, and is a number between 0 and 100 (percent). For simple tasks, Storage Management will provide a probe that computes the percentage done and stores it in the task. For composite tasks, the percentage done is computed from the percentage done values of its child tasks, as described below.

The weight is a measure of how "big" a task is compared to its sibling tasks in the same composite task. The weights are computed by the Storage Management probe for both simple and composite tasks.

The absolute value of any given weight is not important; only the weight's value relative to the weights of sibling tasks is important. So, the size of individual weights may be chosen arbitrarily as long as their relative values match the relative sizes of the tasks. For example, if a composite task has two child tasks A and B, and A is twice as big as B, then the weight of A could be chosen as 1 and the weight of B as 0.5; or, the weight of A could be 10 and the weight of B 5; or, A could be 12 and B 6. As long as the ratio of weight A to weight B is 2 (A is twice as big as B), the specific values chosen are not important, and the storage management probe is free to chose any non-zero value to act as a unit of weight.

The percentage done of simple tasks is set by the Storage Management probe. The percentage done of a composite task is computed by the Task Manager from the percentage done of simple tasks and the weights of child tasks. The percentage done of a composite task is computed as follows. The weights of all the child tasks that make up the composite task are added together, and then the ratio of each child task's weight to the total weight of its sibling tasks is computed. This gives us the fractional contribution of each child task to the percentage done of the composite task. The percentage done of the composite task is then computed by multiplying each simple task's percentage done by its fractional contribution to the overall percentage done, and adding each of these values for all the simple tasks.

If one of the child tasks is itself a composite task, then its percentage done is computed using the algorithm just described, and that value is used to compute the percentage done of the containing composite task.

This algorithm gives correct results for solitary tasks as well. A solitary task is one with no siblings. The root task is a solitary task as is any component task with no siblings. Since there is only one task, the sum of all weights is equal to the weight of the solitary task, so the ratio of the weight to the sum is 1.

The method for determining the values for percentage done and weight for a task is up to the storage management probes and does not change the approach used by the task manager to compute the percentage done of a composite task.

An example: A composite task X has three child tasks A, B, and C, all simple. The Storage Management probe sets the weights of these tasks as follows:
weight(A)=10
weight(B)=5
weight(C)=45

The sum of the weights is 60, so A contributes $10/60=1/6$ to the completion of X, B contributes $5/60=1/12$ to the completion of X, and C contributes $45/60=3/4$ to the completion of X. Note that $1/6=2/12$ and $3/4=9/12$, so the sum of the contributions is $2/12+1/12+9/12=1$, as expected. We can write this as:
contrib(A)=$1/6$
contrib(B)=$1/12$
contrib(C)=$3/4$ If the probe computes the percentage done of each component task as follows:
done(A)=20%=$1/5$
done(B)=50%=$1/2$
done(C)=5%=$1/20$
then the percentage done of X is:

$$contrib(A) \; done(A) + contrib(B) \; done(B) + contrib(C) \; done(C) =$$
$$(1/6)(1/5) + (1/12)(1/2) + (3/4)(1/20) =$$
$$1/30 + 1/24 + 3/80 = 8/240 + 10/240 + 9/240 = 27/240 = 9/80$$

As discussed above, techniques herein are well suited for use in an environment (e.g., storage area network environments) in which tasks and corresponding sub-tasks are executed by multiple processing threads executing in parallel. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A method comprising:
maintaining a pool of multiple processing threads;
receiving a request to initiate execution of a task;
processing the task to identify portions of the task to be executed by separate processing threads according to shared resources required for execution, wherein processing the task to identify portions of the task to be executed by separate processing threads includes:
processing the task to identify a main portion of the task; and
processing the task to identify sub-tasks associated with the main portion of the task, each of the sub-tasks being an identified portion of the task to be executed by a corresponding processing thread in the pool;
monitoring the pool of multiple processing threads;
in response to detecting that a sufficient number of processing threads have freed up for simultaneous execution of each of the identified portions of the task in parallel, submitting the task for execution by the pool of multiple processing threads; and
assigning a first processing thread of the pool to receive the submitted task, the first processing thread, upon receipt of the submitted task, initiating execution of the main portion of the task, execution of the main portion of the task by the first processing thread in the pool spawning execution of multiple sub-tasks associated with the task.

2. A method as in claim 1, wherein assigning a first processing thread of the pool to receive the submitted task, the first processing thread, upon receipt of the submitted task, initiating execution of the main portion of the task, execution of the main portion of the task by the first processing thread in the pool spawning execution of multiple sub-tasks associated with the task comprises:
assigning a second processing thread in the pool for execution of a first sub-task of the multiple sub-tasks associated with the task; and
assigning a third processing thread in the pool for execution of a second sub-task of the multiple sub-tasks associated with the task.

3. A method as in claim 2 further comprising:
while the first processing thread continues execution of the main portion of the task:
detecting that the second processing thread completes execution of the first sub-task; and
in response to detecting that the second processing thread completes execution of the first sub-task, allocating the second processing thread for use by another task including multiple corresponding sub-tasks.

4. A method as in claim 1 further comprising:
receiving a subsequent request to initiate execution of a subsequent task;
processing the subsequent task to identify portions of the subsequent task to be executed by separate processing threads in the pool;
monitoring an availability of the processing threads in the pool that have not been assigned for use by tasks other than the subsequent task; and
in response to detecting that a respective processing thread in the pool completes execution of a sub-task associated with the task, allocating the respective processing thread for use by the subsequent task.

5. A method as in claim 1, wherein monitoring the pool of multiple processing threads includes:
maintaining a reference value to indicate availability of non-allocated processing threads in the pool that are free to execute other tasks; and
in response to submitting the task for execution by the pool of multiple processing threads, modifying the reference value by an amount equal to a number of processing threads needed to complete the task to indicate allocation of the number of processing threads for use by the task.

6. A method as in claim 5 further comprising:
in response to detecting completion of portions of the task as executed by corresponding processing threads in the pool, modifying the reference value to indicate that the pool has a corresponding number of additional free processing threads to execute a subsequent task.

7. A method as in claim 6 further comprising:
receiving a subsequent task for execution by the pool of multiple processing threads;
processing the subsequent task to identify a number of processing threads needed to execute a main task and multiple sub-tasks associated with the subsequent task; and
submitting the subsequent task for execution by the pool of multiple processing threads when the reference value indicates that the pool has enough free processing threads to execute the main task and sub-tasks of the subsequent task in parallel.

8. A method as in claim 1 further comprising:
maintaining the pool of multiple processing threads to include a fixed number of processing threads.

9. A method comprising:
maintaining a pool of multiple processing threads;
processing a task to identify a main portion of the task as well as sub-tasks associated with the main portion of the task according to shared resources required for execution, each of the sub-tasks being an identified portion of the task to be executed by a corresponding processing thread in the pool;
monitoring the pool of multiple processing threads;
in response to detecting that there is a first processing thread free to execute the main portion of the task as well as enough free additional processing threads to execute each of the identified sub-tasks in parallel, submitting the task for execution by the pool of multiple processing threads;
assigning the first processing thread of the pool to receive the submitted task, the first processing thread, upon receipt of the submitted task, initiating execution of the main portion of the task, execution of the main portion of the task by the first processing thread in the pool spawning execution of multiple sub-tasks associated with the task; and
modifying status information associated with the pool to indicate that the first processing thread and additional processing threads are unavailable for use by other processing threads.

10. A method as in claim 9 further comprising:
maintaining the pool of multiple processing threads to include a fixed number of processing threads.

11. A method as in claim 9, wherein modifying the status information associated with the pool to indicate that the first processing thread and additional processing threads are unavailable for use by other processing threads comprises:
upon submitting the task for execution by the pool, simultaneously reserving a block of processing threads including the first processing thread and the additional processing threads to execute the task.

12. A method as in claim 11 further comprising:
receiving indications at different times indicating that the additional processing threads have completed execution of the identified sub-tasks.

13. A method as in claim 12 further comprising:
as respective processing threads are freed up over time as a result of completing execution of a respective sub-task, maintaining the respective processing threads as being free for use by a subsequent task even though the first processing thread has not completed execution of the main portion of the task.

14. A computer system comprising:
a processor;
a memory unit that stores instructions associated with an application executed by the processor; and
an interconnect coupling the processor and the memory unit, enabling the computer system to execute the application and perform operations of:
 maintaining a pool of multiple processing threads;
 processing a task to identify a main portion of the task as well as sub-tasks associated with the main portion of the task according to shared resources required for execution, each of the sub-tasks being an identified portion of the task to be executed by a corresponding processing thread in the pool;
 monitoring the pool of multiple processing threads; and
 in response to detecting that there is a first processing thread free to execute the main portion of the task as well as enough free additional processing threads to execute each of the identified sub-tasks in parallel, submitting the task for execution by the pool of multiple processing threads;
 assigning the first processing thread of the pool to receive the submitted task, the first processing thread, upon receipt of the submitted task, initiating execution of the main portion of the task, execution of the main portion of the task by the first processing thread in the pool spawning execution of multiple sub-tasks associated with the task; and
 modifying status information associated with the pool to indicate that the first processing thread and additional processing threads are unavailable for use by other processing threads.

15. A computer system as in claim 14, wherein monitoring the pool of multiple processing threads comprises:
 maintaining a reference value to indicate availability of non-allocated processing threads in the pool that are free to execute other tasks; and
 in response to submitting the task for execution by the pool of multiple processing threads, modifying the reference value by an amount equal to a number of processing threads needed to complete the task to indicate allocation of the number of processing threads for use by the task.

16. A computer system as in claim 15 further supporting operations of:
 in response to detecting completion of portions of the task as executed by corresponding processing threads in the pool, modifying the reference value to indicate that the pool has a corresponding number of additional free processing threads to execute a subsequent task;
 receiving a subsequent task for execution by the pool of multiple processing threads;
 processing the subsequent task to identify a number of processing threads needed to execute a main task and multiple sub-tasks associated with the subsequent task; and
 submitting the subsequent task for execution by the pool of multiple processing threads when the reference value indicates that the pool has enough free processing threads to execute the main task and sub-tasks of the subsequent task in parallel.

17. Software encoded on one or more non-transitory computer-readable storage media, when executed, the software operable for:
 maintaining a pool of multiple processing threads;
 processing a task to identify a main portion of the task as well as sub-tasks associated with the main portion of the task according to shared resources required for execution, each of the sub-tasks being an identified portion of the task to be executed by a corresponding processing thread in the pool;
 monitoring the pool of multiple processing threads; and
 in response to detecting that there is a first processing thread free to execute the main portion of the task as well as enough free additional processing threads to execute each of the identified sub-tasks in parallel, submitting the task for execution by the pool of multiple processing threads;
 assigning the first processing thread of the pool to receive the submitted task, the first processing thread, upon receipt of the submitted task, initiating execution of the main portion of the task, execution of the main portion of the task by the first processing thread in the pool spawning execution of multiple sub-tasks associated with the task; and
 modifying status information associated with the pool to indicate that the first processing thread and additional processing threads are unavailable for use by other processing threads.

\* \* \* \* \*